United States Patent
Singh et al.

(10) Patent No.: US 12,457,254 B2
(45) Date of Patent: Oct. 28, 2025

(54) METHODS, SYSTEMS, AND COMPUTER READABLE MEDIA FOR EXCHANGING OUTBOUND REGISTRATION COUNT INFORMATION AMONG INTERROGATING CALL SESSION CONTROL FUNCTIONS (I-CSCFS) AND USING THE OUTBOUND REGISTRATION COUNT INFORMATION FOR SERVING CSCF (S-CSCF) SELECTION

(71) Applicant: Oracle International Corporation, Redwood Shores, CA (US)

(72) Inventors: Arvind Kumar Singh, Bangalore (IN); Agnivesh Kumpati, Telangana (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 215 days.

(21) Appl. No.: 18/240,842

(22) Filed: Aug. 31, 2023

(65) Prior Publication Data
US 2025/0080590 A1    Mar. 6, 2025

(51) Int. Cl.
*H04L 65/1073* (2022.01)
*H04L 65/1016* (2022.01)

(52) U.S. Cl.
CPC ...... *H04L 65/1073* (2013.01); *H04L 65/1016* (2013.01)

(58) Field of Classification Search
None
See application file for complete search history.

(56) References Cited

U.S. PATENT DOCUMENTS

| 9,413,670 B2 | 8/2016 | Chiduruppa et al. |
| 9,680,764 B2 * | 6/2017 | Prakash .............. H04L 63/0272 |

(Continued)

FOREIGN PATENT DOCUMENTS

| WO | WO-03075596 A1 * | 9/2003 | .............. H04W 8/12 |
| WO | WO-2008019056 A2 * | 2/2008 | ......... H04L 65/1046 |
| WO | WO-2019208460 A1 * | 10/2019 | .............. H04M 3/00 |

OTHER PUBLICATIONS

Oracle Communications Core Session Manager, Essentials Guide (Feb. 2022).

(Continued)

*Primary Examiner* — Sandarva Khanal
(74) *Attorney, Agent, or Firm* — Jenkins, Taylor & Hunt, P.A.

(57) ABSTRACT

A method includes receiving, at a first I-CSCF of a cluster of I-CSCFs and from each S-CSCF in a cluster of S-CSCFs, a value indicating a registration capacity of the S-CSCF. The method further includes receiving, at the first I-CSCF and from at least one other I-CSCF in the cluster of I-CSCFs, outbound registration counts indicating numbers of outbound registrations that the at least one other I-CSCF has with the S-CSCFs in the cluster of S-CSCFs. The method further includes calculating, by the first I-CSCF and using the values indicating the registration capacities of the S-CSCFs and the outbound registration counts, values indicating updated registration capacities of the S-CSCFs. The method further includes using, by the first I-CSCF, the values indicating the updated registration capacities to select an S-CSCF for at least one outbound registration message.

12 Claims, 6 Drawing Sheets

(56) References Cited

U.S. PATENT DOCUMENTS

| | | | |
|---|---|---|---|
| 2007/0283022 A1* | 12/2007 | Rajko | H04W 60/00 709/227 |
| 2008/0056234 A1 | 3/2008 | Sprague | |
| 2012/0166621 A1* | 6/2012 | Sharma | H04L 41/042 709/224 |
| 2013/0054806 A1* | 2/2013 | Francis | H04L 65/80 709/226 |
| 2014/0092853 A1 | 4/2014 | Noldus | |
| 2016/0099871 A1* | 4/2016 | Chiduruppa | H04L 65/1016 709/226 |
| 2017/0026423 A1* | 1/2017 | Merino Vazquez | H04L 65/1073 |
| 2020/0120146 A1* | 4/2020 | Christopher | H04L 65/1016 |
| 2024/0064504 A1* | 2/2024 | Ligeret | H04L 61/4511 |
| 2024/0205268 A1* | 6/2024 | Allu Balan | H04L 65/1016 |
| 2025/0106264 A1* | 3/2025 | Dopico Sanjuan | H04L 65/1069 |

OTHER PUBLICATIONS

J. Rosenberg, "SIP: Session Initiation Protocol", Network Working Group, RFC 3261 (Jun. 2002).

V. Fjardo, Ed., "Diameter Base Protocol", Internet Engineering Task Force (IETF), RFC 6733 (Oct. 2012).

Notification of Transmittal of the International Search Report and the Written Opinion of the International Searching Authority, or the Declaration for International Patent Application Serial No. PCT/US2024/042975 (Nov. 8, 2024).

\* cited by examiner

METHODS, SYSTEMS, AND COMPUTER READABLE MEDIA FOR EXCHANGING OUTBOUND REGISTRATION COUNT INFORMATION AMONG INTERROGATING CALL SESSION CONTROL FUNCTIONS (I-CSCFS) AND USING THE OUTBOUND REGISTRATION COUNT INFORMATION FOR SERVING CSCF (S-CSCF) SELECTION

TECHNICAL FIELD

The subject matter described herein relates to messaging in internet protocol multimedia subsystem (IMS) networks. More particularly, the subject matter described herein relates to exchanging outbound registration count information among I-CSCFs and using the outbound registration count information for S-CSCF selection.

BACKGROUND

In IMS networks, the call session control function is the entity that handles IMS registration traffic to register a user equipment (UE) when the UE attaches to the network. There are three types of CSCFs—the proxy CSCF (P-CSCF), the I-CSCF, and the S-CSCF. The P-CSCF receives IMS registration requests sent on behalf of a UE and acts as a proxy by forwarding the registration requests to an I-CSCF in the core network. The I-CSCF receives IMS registration requests from P-CSCFs, selects an S-CSCF, and forwards the IMS registration requests to the selected S-CSCF. The S-CSCF functions as the registrar for UE registrations by processing the registration requests.

One problem in IMS networks is that S-CSCFs can become overloaded with registration traffic because of unequal loading of the S-CSCFs. S-CSCFs can communicate their registration capacities to I-CSCFs. However, the I-CSCFs each receive and have access to the full registration capacity of the S-CSCFs. As a result, two different I-CSCFs may seek to utilize the full registration capacity of a given S-CSCF, which may cause the S-CSCF to become overloaded.

In light of these and other difficulties, there exists a need for exchanging outbound registration count information among I-CSCFs and using the registration count information for S-CSCF selection.

SUMMARY

A method for exchanging outbound registration count information among interrogating call session control functions (I-CSCFs) and using the outbound registration count information for serving CSCF (S-CSCF) selection includes receiving, at a first I-CSCF of a plurality of I-CSCFs in a cluster of I-CSCFs and from each of a plurality of S-CSCFs in a cluster of S-CSCFs, a value indicating a registration capacity of the S-CSCF. The method further includes receiving, at the first I-CSCF and from at least one other I-CSCF in the cluster of I-CSCFs, outbound registration counts indicating numbers of outbound registrations that the at least one other I-CSCF has with the S-CSCFs in the cluster of S-CSCFs. The method further includes calculating, by the first I-CSCF and using the values indicating the registration capacities of the S-CSCFs and the outbound registration counts, values indicating updated registration capacities of the S-CSCFs. The method further includes using, by the first I-CSCF, the values indicating the updated registration capacities to select an S-CSCF for at least one outbound registration message.

According to another aspect of the subject matter described herein, receiving the values indicating the registration capacities of the S-CSCFs includes receiving the values indicating the registration capacities over a Diameter interface.

According to another aspect of the subject matter described herein, receiving the outbound registration counts includes receiving the outbound registration counts via a Diameter interface.

According to another aspect of the subject matter described herein, receiving the outbound registration counts via a Diameter interface includes receiving the outbound registration counts via Diameter service association request (SVR) messages.

According to another aspect of the subject matter described herein, receiving the outbound registration counts via the Diameter SVR messages includes receiving the outbound registration counts via an outbound registration count attribute value pair (AVP) included in each of the Diameter SVR messages.

According to another aspect of the subject matter described herein, receiving the outbound registration counts via the outbound registration count AVP includes receiving, for each of the S-CSCFs with which the at least one other I-CSCF has active registrations, an S-CSCF name and a corresponding outbound registration count.

According to another aspect of the subject matter described herein, calculating the value indicating the updated registration capacity of each of the S-CSCFs includes, for each of the S-CSCFs, summing the outbound registration count received from the at least one other I-CSCF in the cluster and an outbound registration count of the first I-CSCF to generate a total registration count for the S-CSCF and subtracting the total registration count from the value indicating the registration capacity of the S-CSCF.

According to another aspect of the subject matter described herein, using the values indicating the updated registration capacities to select an S-CSCF for an outbound registration message includes providing the values indicating the updated registration capacities to a load balancing algorithm that selects the S-CSCF.

According to another aspect of the subject matter described herein, using the values indicating the updated registration capacities to select the S-CSCF includes using the values indicating the updated registration capacities to determine that one S-CSCF is unhealthy or more loaded than other S-CSCFs in the cluster of S-CSCFs and to select an alternate S-CSCF from the cluster of S-CSCFs.

According to another aspect of the subject matter described herein, the method for distributing and using outbound registration count information includes communicating, by the first I-CSCF, outbound registration counts of the first I-CSCF to the at least one other I-CSCF in the cluster of I-CSCFs.

According to another aspect of the subject matter described herein, a system for exchanging outbound registration count information among interrogating call session control functions (I-CSCFs) and using the outbound registration count information for serving CSCF (S-CSCF) selection is provided. The system includes a first I-CSCF of a plurality of I-CSCFs in a cluster of I-CSCFs, the first I-CSCF including at least one processor and a memory. The system further includes an updated registration capacity calculation module executable by the at least one processor for receiving, from each of a plurality of S-CSCFs in a cluster of S-CSCFs, a value indicating a registration capacity of the S-CSCF, receiving, from at least one other I-CSCF in the cluster of I-CSCFs, outbound registration counts indicating numbers of outbound registrations that the at least one other I-CSCF has with the S-CSCFs in the cluster of S-CSCFs, and calculating, using the values indicating the registration capacities of the S-CSCFs and the outbound registration counts, values indicating updated registration capacities of the S-CSCFs. The system further includes an S-CSCF selection module executable by the at least one processor for using the values indicating the updated registration capacities to select an S-CSCF for at least one outbound registration message.

According to another aspect of the subject matter described herein, the updated registration capacity calculation module is configured to receive the values indicating the registration capacities of the S-CSCFs over a Diameter interface.

According to another aspect of the subject matter described herein, the updated registration capacity calculation module is configured to receive the outbound registration counts via a Diameter interface.

According to another aspect of the subject matter described herein, the updated registration capacity calculation module is configured to receive the outbound registration counts via Diameter service association request (SVR) messages.

According to another aspect of the subject matter described herein, the Diameter SVR messages each include an outbound registration count attribute value pair (AVP) that carries the outbound registration counts.

According to another aspect of the subject matter described herein, the outbound registration count AVP includes an S-CSCF name and a corresponding outbound registration count.

According to another aspect of the subject matter described herein, in calculating the value indicating the updated registration capacity of each of the S-CSCFs, the updated registration capacity calculation module is configured to, for each of the S-CSCFs, sum the outbound registration count received from the at least one other I-CSCF in the cluster and an outbound registration count of the first I-CSCF to generate a total registration count for the S-CSCF and subtract the total registration count for the S-CSCF from the value indicating the registration capacity of the S-CSCF.

According to another aspect of the subject matter described herein, in using the values indicating the updated registration capacities to select an S-CSCF for an outbound registration message, the S-CSCF selection module is configured to provide the values indicating the updated registration capacities to a load balancing algorithm that selects the S-CSCF.

According to another aspect of the subject matter described herein, the system for distributing and using outbound registration count information includes an outbound registration count tracking/communication module for communicating outbound registration counts of the first I-CSCF to the at least one other I-CSCF in the cluster of I-CSCFs.

According to another aspect of the subject matter described herein, a non-transitory computer readable medium having stored thereon executable instructions that when executed by a processor of a computer control the computer to perform steps is provided. The steps include receiving, at a first interrogating call session control function (I-CSCF) of a plurality of I-CSCFs in a cluster of I-CSCFs and from each of a plurality of serving CSCFs (S-CSCFs) in a cluster of S-CSCFs, a value indicating a registration capacity of the S-CSCF. The steps further include receiving, at the first I-CSCF and from at least one other I-CSCF in the cluster of I-CSCFs, outbound registration counts indicating numbers of outbound registrations that the at least one other I-CSCF has with the S-CSCFs in the cluster of S-CSCFs. The steps further include calculating, by the first I-CSCF and using the values indicating the registration capacities of the S-CSCFs and the outbound registration counts, values indicating updated registration capacities of the S-CSCFs. The steps further include using, by the first I-CSCF, the values indicating the updated registration capacities to select an S-CSCF for at least one outbound registration message.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

To reduce the likelihood of S-CSCFs becoming overloaded and/or of selecting an unhealthy S-CSCF or an S-CSCF that is more loaded than other S-CSCFs in a cluster of S-CSCFs for a new IMS registration, the subject matter described herein introduces a new interface, referred to as the Sc-ext interface, between I-CSCFs, which allows I-CSCFs to exchange outbound registration count information with each other. Outbound registration count information refers to the number of successful active IMS registrations that an I-CSCF has with each S-CSCF in a cluster of S-CSCFs. The I-CSCFs can use the outbound registration counts along with registration capacity information of the S-CSCFs reported by the S-CSCFs over an interface between the S-CSCFs and the I-CSCFs, referred to as the Sc interface, to calculate updated registration capacities of the S-CSCFs. The I-CSCFs can then use the updated registration capacities to perform S-CSCF selection, for example, using a load balancing algorithm.

Figure 1:
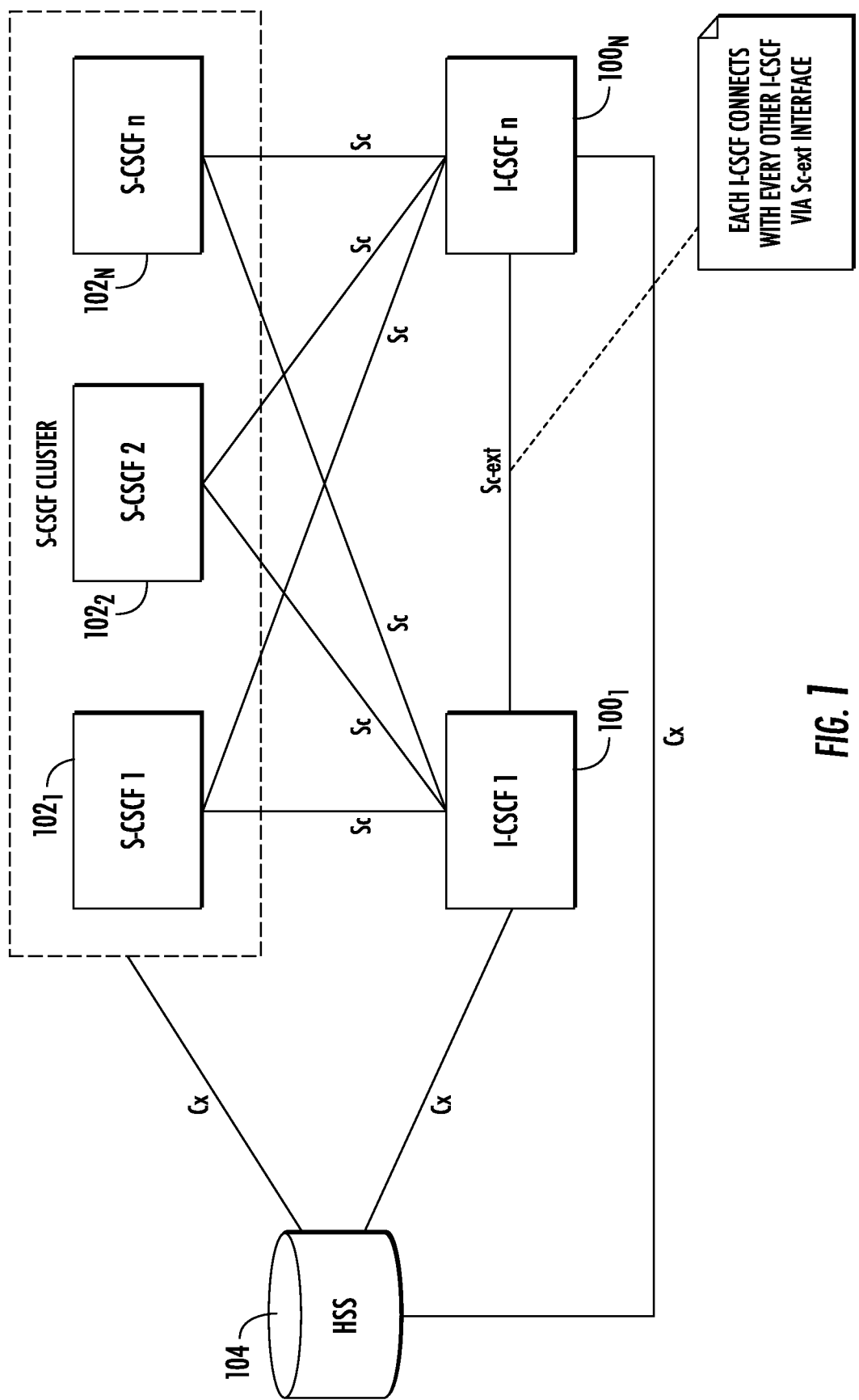
FIG. 1 is a network diagram illustrating I-CSCFs, S-CSCFs, and interfaces between the I-CSCFs for exchanging outbound registration count information.

FIG. 1 is a network diagram illustrating I-CSCFs, S-CSCFs, and the Sc-ext interfaces between the I-CSCFs for exchanging outbound registration count information. In FIG. 1. I-CSCFs $100_1$-$100_N$ send IMS registrations to S-CSCFs $102_1$-$102_N$ in a cluster of S-CSCFs. A home subscriber server (HSS) 104 stores subscription information for IMS users. S-CSCFs $102_1$-$102_N$ communicate registration capacity information to I-CSCFs $100_1$-$100_N$ over the Sc interface. The Sc interface is used to dynamically manage multiple S-CSCFs. Using the Sc interface, S-CSCFs can register and de-register with the I-CSCF at any time. The Sc interface can also be used to negotiate capabilities between I-CSCFs and S-CSCFs. The S-CSCFs can advertise dynamically adjusted capacity (based on key performance indicators (KPIs)) and service information to I-CSCFs. Using the KPI information, the I-CSCF will be able to manage S-CSCF availability. The Sc interface is further used for reliable transport to deliver messages between I-CSCFs and S-CSCFs and for error notifications. However, without the Sc-ext interface, the I-CSCFs lack a way to communicate with each other and share useful information related to load balancing, which limits the ability of the I-CSCFs to load balance registrations among S-CSCFs.

Consider the case where there are two I-CSCFs, I-CSCF-A and I-CSCF-B, and one S-CSCF, S-CSCF-A. Assume S-CSCF-A has registered itself to both of the I-CSCFs via the Sc interface. When S-CSCF-A publishes its current maximum endpoint supported capacity (e.g., Max-Eps-Supp=10) to both I-CSCFs, each of the I-CSCFs will have the same snapshot of KPI metric data of S-CSCF-A. Therefore, each of these I-CSCFs, from their respective viewpoints, "assume" S-CSCF-A has the capacity to handle 10 subscribers.

If both I-CSCF-A and I-CSCF-B send 10 registrations each to this S-CSCF individually, that would effectively mean 20 (i.e., 10 from I-CSCF-A and 10 from I-CSCF-B) transactions to be processed by S-CSCF-A, which exceeds the processing capacity of S-CSCF-A and which may eventually cause a traffic burst/transaction timeout. S-CSCF-A may update its capacity to I-CSCF-A and I-CSCF-B via Diameter service association request (SVR) messages sent over the Sc interface. The updates are typically sent periodically, e.g., every 60 seconds. However, S-CSCF-A could become overloaded before reporting its updated capacity (e.g., processing capacity, memory capacity, and maximum supported endpoints) to I-CSCF-A and I-CSCF-B.

One possible way to reduce the likelihood of overloading an S-CSCF is to increase the frequency of SVR refresh messages on the Sc interface. However, increasing the frequency of SVR refresh messages will only worsen the situation further by increasing traffic in the core network. Using the Sc-ext interface described herein, I-CSCFs will have the ability to communicate among themselves and share relevant information regarding S-CSCFs with which they are associated. By exchanging information, such as outbound registrations with each S-CSCF, I-CSCFs in the same mesh network can make informed decisions about routing traffic to healthy/capable S-CSCFs and avoid selecting S-CSCFs that are likely to encounter capacity overload issues. The Sc-ext interface includes AVPs that can be carried in SVR messages and used to share the outbound registration count information among I-CSCFs. Examples of the AVPs will be described in detail below.

The Sc-ext interface between I-CSCF nodes can be used for many purposes and is not limited to exchanging outbound registration count information. For instance, the Sc-ext interface can be used to share KPI metrics (server capacities, current loads, health statuses, etc.) of each I-CSCF to other I-CSCFs in the same cluster periodically so that if a particular I-CSCF is overloaded, other healthy I-CSCFs can take over the load balancing control as a backup. Using the Sc-ext interface in this manner enables I-CSCFs to make intelligent decisions on how to distribute traffic effectively and avoid overloading specific nodes.

When new S-CSCFs are added to or removed from the network, I-CSCFs can exchange information among themselves about the new S-CSCFs' capacities and update the information used by the load balancing algorithms of the I-CSCFs, ensuring a smooth S-CSCF scaling process and endpoint allocation. By sharing the outbound registration information, I-CSCFs in the same cluster will have knowledge about the S-CSCFs with which other I-CSCFs in the cluster have active registrations. In addition to having information about the S-CSCF capacities, each of the I-CSCFs will also have information about how many SIP/IMS (registration) requests are sent towards and processed successfully by each of the S-CSCFs in each reporting interval on the Sc-ext interface. The number of SIP/IMS registration requests sent by an I-CSCF to an S-CSCF and is successfully processed by the S-CSCF is referred to as an outbound registration count. The S-CSCF capacity information and the outbound registration counts of the S-CSCFs can be fed as input to load balancing algorithm at each I-CSCF for efficient load balancing.

For the sake of simplicity, let us consider a case where there are three S-CSCFs and a cluster of two I-CSCFs. The tables and the associated description below illustrate a sequence of steps that may be performed in this situation. At time t1, all of the S-CSCFs have published their respective KPI metric and service information to both the I-CSCFs via SVR messages. Table 1 illustrates the reported capacities of the S-CSCFs and the capacity of each S-CSCF from the point of view of each I-CSCF.

TABLE 1

Reported Capacities of S-CSCFs and Capacities from I-CSCF

| S-CSCF | KPI Published by S-CSCF A | KPI from Point of View of I-CSCF-A | KPI from Point of View of I-CSCF-B |
|---|---|---|---|
| S-CSCF-A | 10 | 10 | 10 |
| S-CSCF-B | 20 | 20 | 20 |
| S-CSCF-C | 30 | 30 | 30 |

Points of View

From Table 1, it can be seen that each I-CSCF sees and believes it has access to the full capacity of each S-CSCF (without regard to whether any of that capacity is being used by another I-CSCF).

Table 2 shown below illustrates a problem with this scenario. Since each of the I-CSCFs has a snapshot view that S-CSCF-A/B/C can handle 10/20/30 subscribers, respectively, there is a high probability that the S-CSCFs will become overloaded with registrations.

TABLE 2

S-CSCF Overloading

| S-CSCF | Number of Regs sent by I-CSCF-A | Number of Regs Sent by I-CSCF-B | Cumulative Number of Regs on each S-CSCF |
|---|---|---|---|
| S-CSCF-A | 10 | 10 | 20 |
| S-CSCF-B | 20 | 20 | 40 |
| S-CSCF-C | 30 | 30 | 60 |

From Table 2, it can be seen that if I-CSCF-A and I-CSCF-B each attempt to access the full processing capacities of S-CSCFs A, B, and C, the S-CSCFs would all be overloaded.

Using the Sc-ext interface described herein, I-CSCFs do not solely rely on the information they receive from S-CSCFs. Instead, they receive outbound registration count information from other I-CSCFs in the network.

In one example, I-CSCFs publish the outbound registration count information via the Sc-ext interface, which is a Diameter interface. The type of message used to communicate the outbound registration count information is a Diameter SVR message. The SVR message may include a list of S-CSCF names and number of successful registrations sent towards each S-CSCF via an Outbound-Reg-Count AVP in the SVR message.

In one example, the SVR message may include an Outbound-Reg-Count AVP, which carries the following XML data:

```
<OutboundRegistrationCount>
<ServingCSCF>
<ServerName></ServerName>
<OutboundRegCount></OutboundRegCount>
```

The following are definitions of the attributes in the outbound registration count AVP:
OutboundRegistrationCount—Indicates the start/end tags for the complete XML tree
ServingCSCF—Parent tag enclosing the information of each S-CSCF.
ServerName—This tag indicates the Server Name/SIP URI of the S-CSCF
OutboundRegCount—This tag indicates the number of successful registrations sent towards this S-CSCF since the last SVR update on Sc-ext interface.

Each of the I-CSCFs keep track of number of successful registrations sent towards each of the S-CSCFs that they are registered with, and, at a predefined regular interval, the I-CSCFs publish the information via the Outbound-Reg-Count AVP in an SVR message sent to other I-CSCFs on the Sc-ext interface. The following is an example of the structure of the SVR message.

```
<SVR> ::= < Diameter Header: 400, REQ, PXY, 16777220 >
{Vendor-Specific-Application-Id }
{ Origin-Host }
{ Origin-Realm }
{ Destination-Realm }
{ Service-Assoc-Id }
```

-continued

```
{ Request-Type }
[ Destination-Host ]
[ Cluster-Id ]
[ Outbound-Reg-Count]
<OutboundRegistrationCount>
<ServingCSCF>
<ServerName></>
<OutboundRegCount></>
</ServingCSCF>
</OutboundRegistrationCount>
```

In the SVR Message structure, the [OutboundRegCount] attribute stores a list of outbound registration counts for each S-CSCF registered to communicate with the I-CSCF. The <ServingCSCF> attribute stores the name of the S-CSCF.

In response to receiving a list of S-CSCF identifiers and their respective outbound registration counts, the receiving I-CSCF calculates the updated registration capacity of each S-CSCF using the following equation:

$$\text{Updated Reg. Capacity of S-CSCF} = \text{S-CSCF reported capacity} - \text{sum}(x, y \ldots)$$

where $x, y \ldots$ are the outbound registration count values of the S-CSCFs reported by each I-CSCF and the outbound registration count values maintained by the sending I-CSCF.

The load balancing algorithm of the I-CSCF uses the updated registration capacities of the S-CSCFs as input. Using the updated registration capacities rather than the reported registration capacities reduces the likelihood of overloading the S-CSCFs. In addition, overall load balancing by the I-CSCF is performed more efficiently and the likelihood of traffic burst/transaction timeouts is reduced.

Figure 2:
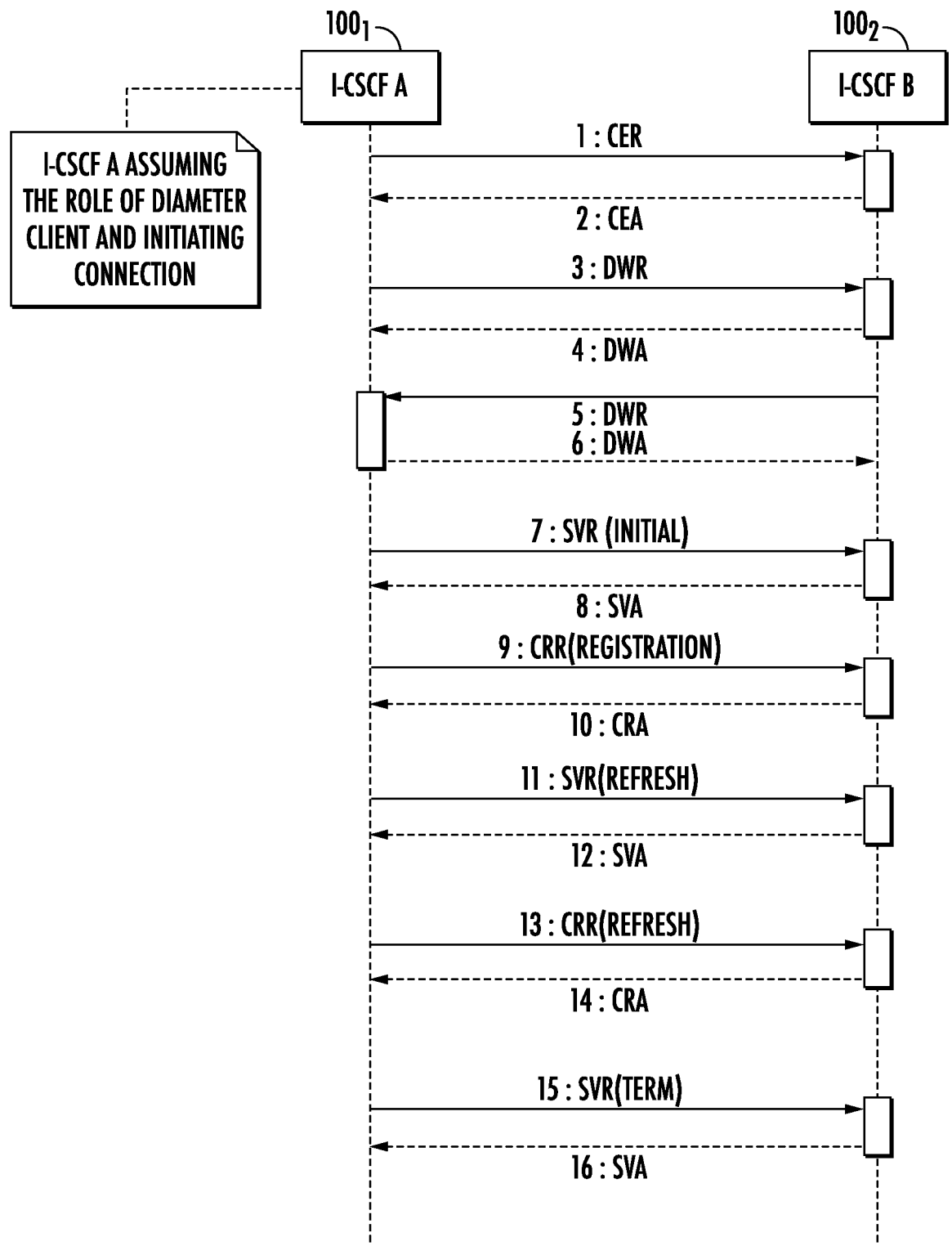
FIG. 2 is a message flow diagram illustrating exemplary messages exchange between I-CSCFs on the Sc-ext interface.

FIG. 2 is a message flow diagram illustrating the exchanging of registration count information over the Sc-ext interface. Referring to FIG. 2, In lines 1 and 2 of the message flow diagram, I-CSCF A $100_1$ and I-CSCF B $100_2$ exchange Diameter capabilities exchange request (CER) and Diameter capabilities exchange answer (CEA) messages to establish a Diameter connection between I-CSCF A and I-CSCF B for the Sc-ext interface. In lines 3-6 of the message flow diagram, I-CSCF A $100_1$ and I-CSCF B $100_2$ exchange Diameter watchdog request (DWR) and Diameter watchdog answer (DWA) messages to set Diameter watchdog timers for messages exchanged over the Sc-ext interface.

In line 7, I-CSCF A $100_1$ sends an SVR message to I-CSCF B $100_2$ over the Sc-ext interface and includes, in the SVR message, outbound registration counts and S-CSCF names of S-CSCFs registered with I-CSCF A $100_1$. I-CSCF B $100_2$ receives the SVR message, reads the outbound registration counts and server names, calculates updated registration capacities of each S-CSCF and responds, as indicated in line 8 with a service association answer (SVA) message.

In line 9 of the message flow diagram, I-CSCF A $100_1$ sends a core registration request (CRR) message to I-CSCF B $100_2$. The CRR message is a Diameter message used by the I-CSCF to register the I-CSCF with other I-CSCFs. In line 10, I-CSCF B $100_2$ responds to the CRR message with a core registration answer (CRA) message.

In line 11, I-CSCF A $100_1$ sends another SVR message to I-CSCF B $100_2$ to update the registration counts with I-CSCF B $100_2$. I-CSCF B $100_2$ receives the SVR message, calculates updated registration capacities of the S-CSCFs based on the outbound registration counts, and, in line 12, sends an SVA message to I-CSCF A $100_1$.

In line 13 of the message flow diagram, I-CSCF A 100₁ sends a CRR message to I-CSCF B 100₂. In line 14, I-CSCF B 100₂ responds to the CRR message with a CRA message.

In line 15, S-CSCF A 100₁ sends another SVR message to I-CSCF B 100₂ to terminate the Sc-ext connection and update the registration counts with I-CSCF 100₂. I-CSCF B 100₂ receives the SVR message, calculates updated registration capacities of the S-CSCFs based on the outbound registration counts, and, in line 16, sends an SVA message to I-CSCF A 100₁.

To provide a concrete example, assume that S-CSCFs, S-CSCF A, S-CSCF B, and S-CSCF C, have reported registration capacities of 10, 20, and 30 to I-CSCF A 100₁ and I-CSCF B 100₂. Assume that I-CSCF A 100₁ has sent 2, 6, and 7 registrations towards S-CSCF A/B/C, respectively, and I-CSCF B 100₂ has sent 3, 4, 14 registrations towards S-CSCF A/B/C respectively, then the same information is sent as XML data by each I-CSCF to the other I-CSCF.

A similar process is repeated at each I-CSCF at a predefined regular interval. Typically, the number of I-CSCFs is small, and therefore this information exchange will not have any performance impact on the system.

Table 3 shown below illustrates the registration counts that will be tracked by each I-CSCF and communicated to other I-CSCFs.

TABLE 3

Registrations Sent to I-CSCFs

| S-CSCF | No. of Regs Sent by I-CSCF A | No. of Regs Sent by I-CSCF B |
|---|---|---|
| S-CSCF-A | 2 | 3 |
| S-CSCF-B | 6 | 4 |
| S-CSCF-C | 7 | 14 |

The following is an example of the outbound registration count that information that is sent from I-CSCF A 100₁ to I-CSCF B 100₂ on Sc-ext interface for the example in Table 3.

```
<OutboundRegistrationCount>
<ServingCSCF>
    <ServerName>sip:scscfA:5060</ServerName>
    <OutboundRegCount>2</OutboundRegCount >
</ServingCSCF>
<ServingCSCF>
    <ServerName>sip:scscfB:5060</ServerName>
    <OutboundRegCount>6</OutboundRegCount >
</ServingCSCF>
<ServingCSCF>
    <ServerName>sip:scscfC:5060</ServerName>
    <OutboundRegCount>7</OutboundRegCount >
</ServingCSCF>
</OutboundRegistrationCount>
```

The following is an example of the outbound registration count information that will be sent from I-CSCF B 100₂ to I-CSCF A 100₁ on the Sc-ext interface:

```
<OutboundRegistrationCount>
<ServingCSCF>
    <ServerName>sip:scscfA:5060</ServerName>
    <OutboundRegCount>3</OutboundRegCount >
</ServingCSCF>
<ServingCSCF>
    <ServerName>sip:scscfB:5060</ServerName>
    <OutboundRegCount>4</OutboundRegCount >
</ServingCSCF>
<ServingCSCF>
    <ServerName>sip:scscfC:5060</ServerName>
    <OutboundRegCount>14</OutboundRegCount >
</ServingCSCF>
</OutboundRegistrationCount>
```

Upon receiving the XML-formatted data above, each of I-CSCF A 100₁ and I-CSCF-B 100₂ will parse the outbound registration count information, generate a sum of the outbound registration counts for each of the S-CSCFs, and feed the total outbound registration counts along with the registration capacities of the S-CSCFs to a load balancing algorithm. Table 4 shown below illustrates the registration count information and the registration capacity information for this example.

TABLE 4

Outbound Registration Counts and Registration Capacities

| S-CSCF | Registration Capacity Published by S-CSCF | No. of Regs Sent by I-CSCF A | No. of Regs Sent by I-CSCF B |
|---|---|---|---|
| S-CSCF-A | 10 | 2 | 3 |
| S-CSCF-B | 20 | 6 | 4 |
| S-CSCF-C | 30 | 7 | 14 |

Once each I-CSCF receives the outbound registration counts and registration capacities, each I-CSCF will compute an updated registration capacity of each S-CSCF using the following equations:

$$\text{Updated Capacity of } S\text{-}CSCF\ A = S\text{-}CSCF\ A \text{ reportedcapacity} - \text{sum}(2, 3)$$

$$= 10 - 5 = 5$$

$$\text{Updated Capacity of } S\text{-}CSCF\ B = S\text{-}CSCF\ B \text{ reportedcapacity} - \text{sum}(6, 4)$$

$$= 20 - 10 = 10$$

$$\text{Updated Capacity of } S\text{-}CSCF\ C = S\text{-}CSCF\ C \text{ reportedcapacity} - \text{sum}(7, 14)$$

$$= 30 - 21 = 9$$

Each of the I-CSCFs uses the updated registration capacities to perform S-CSCF selection. For example, because S-CSCF B has twice the capacity of S-CSCF A, S-CSCF B may be assigned as selection weight for load balancing purposes that is twice the weight assigned to S-CSCF A. The selection weights may then be used to select one of the S-CSCFs for the next registration request according to a weighted load balancing algorithm, such as a weighted round robin algorithm.

Figure 3:
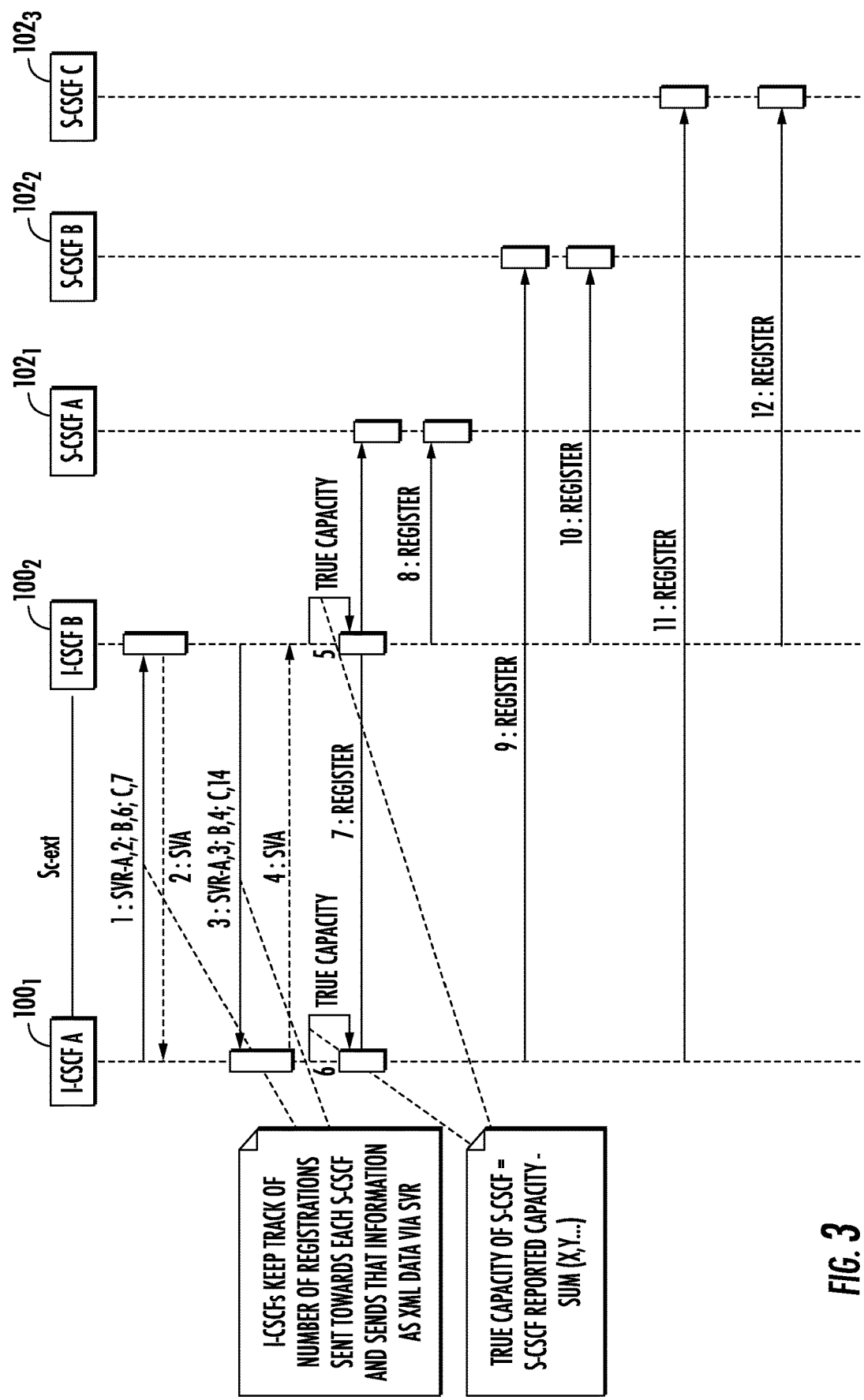
FIG. 3 is a message flow diagram illustrating the exchange and use of outbound registration count information by I-CSCFs.

FIG. 3 is a message flow diagram illustrating the distribution of registration count information among I-CSCFs and the use of the registration count information to load balance registrations among S-CSCFs. Referring to FIG. 3, in lines 1-4, I-CSCF A $100_1$ and I-CSCF B $100_2$ exchange registration count information for S-CSCFs $102_1$, $102_2$, and $102_3$. In lines 5 and 6, I-CSCF A $100_1$ and I-CSCF B $100_2$ calculate updated registration capacities for S-CSCF A $102_1$, S-CSCF B $102_2$, and S-CSCF C $102_3$. In lines 7-12, I-CSCF A $100_1$ and I-CSCF B $100_2$ send new SIP REGISTER messages to S-CSCF A $102_1$, S-CSCF B $102_2$ and S-CSCF C $102_3$ using the updated registration count information to perform the S-CSCF selection.

Figure 4:
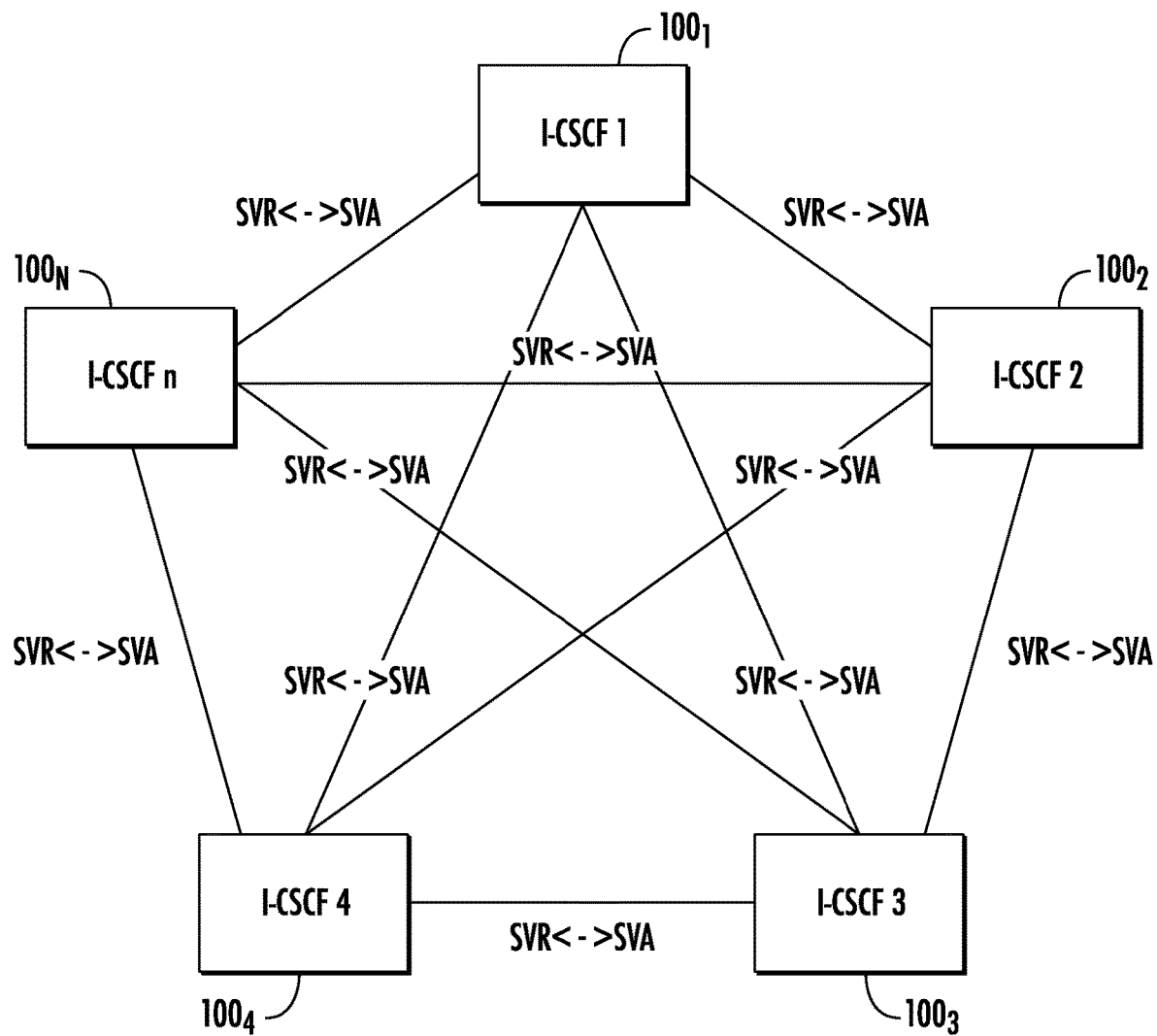
FIG. 4 is a network diagram illustrating a cluster of I-CSCFs.

The distribution of outbound registration count information among I-CSCFs is particularly useful when the I-CSCFs are arranged in a cluster. FIG. 4 is a network diagram illustrating a cluster of I-CSCF nodes. In FIG. 4, I-CSCFs $100_1$-$100_N$ are each connected to each of the other I-CSCFs in the cluster via an Sc-ext interface to form a mesh configuration. Each of I-CSCFs $100_1$-$100_N$ exchange outbound registration count information with each of the other I-CSCFs in the cluster of using SVR messages, as described above. Each of I-CSCFs $100_1$-$100_N$ calculates updated registration capacities for the S-CSCFs and uses the updated registration capacities for S-CSCF selection.

Figure 5:
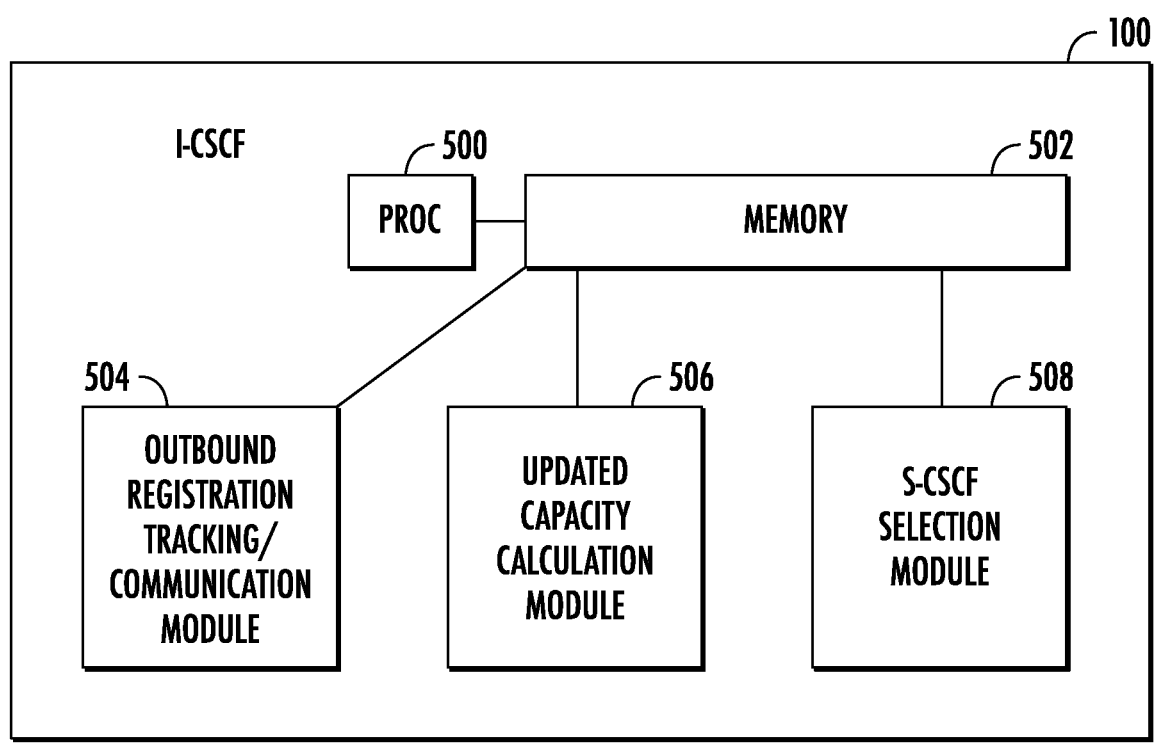
FIG. 5 is a block diagram illustrating an exemplary architecture for an I-CSCF capable of sharing outbound registration count information with other I-CSCFs and using the outbound registration count information from other I-CSCFs for S-CSCF selection.

FIG. 5 is a block diagram illustrating an exemplary architecture for an I-CSCF according to the subject matter described herein. Referring to FIG. 5, I-CSCF 100 includes at least one processor 500 and memory 502. I-CSCF 500 further includes an outbound registration tracking/communication module 504 that tracks outbound registrations of I-CSCF 100 with S-CSCFs and that communicates the number of outbound registrations to other I-CSCFs over the Sc-ext interface. I-CSCF 100 includes an updated registration capacity calculation module 506 that receives outbound registration count information from other I-CSCFs, receives registration capacity information from S-CSCFs, and computes updated registration capacities using the formula described above. I-CSCF 100 further includes an S-CSCF selection module 508 that uses the updated registration capacities to perform S-CSCF selection. Each of modules 504, 506, and 508 can be implemented using computer executable instructions stored in memory 502 and executed by processor 500.

Figure 6:
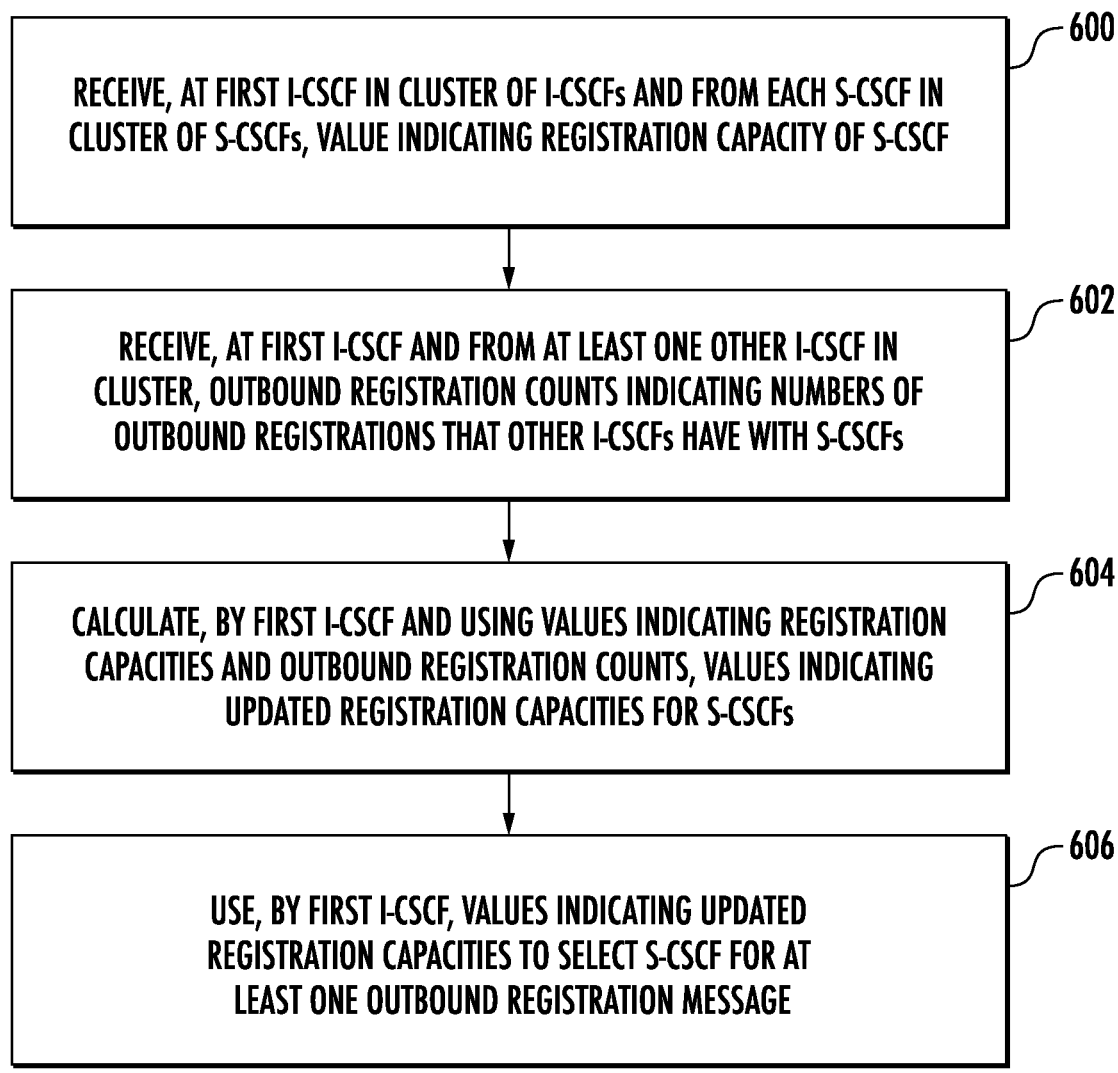
FIG. 6 is a flow chart illustrating an exemplary process performed by an I-CSCF for distributing and using outbound registration count information for S-CSCF selection.

FIG. 6 is a flow chart illustrating an exemplary process for exchanging and using outbound registration count information for S-CSCF selection. Referring to FIG. 6, in step 600, the process includes receiving, at a first of a plurality of interrogating CSCFs (I-CSCFs) in a cluster of I-CSCFs and from each of the S-CSCFs in the cluster of S-CSCFs, a value indicating a registration capacity of the S-CSCF. For example, and I-CSCF may receive, from S-CSCFs and over a Diameter interface, such as the Sc interface, messages carrying values that indicate the registration capacities, i.e., the number of concurrent IMS registrations that each S-CSCF can handle. In one example, the registration capacities can be carried in SVR messages.

In step 602, the process includes receiving, at the first I-CSCF and from at least one other I-CSCF in the cluster of I-CSCFs, outbound registration counts indicating numbers of outbound registrations that the at least one other I-CSCF has with the S-CSCFs in the cluster of S-CSCFs. For example, each I-CSCF in a cluster of I-CSCFs may receive, from other I-CSCFs in the cluster and via a Diameter interface, messages that indicate the number of outbound registrations that each I-CSCF has with each S-CSCF. In one example, the outbound registration counts may be carried in the above-described outbound registration count AVPs in SVR messages.

In step 604, the process further includes calculating, by the first I-CSCF and using the values indicating the registration capacities of the S-CSCFs and the outbound registration counts, updated registration capacities of the S-CSCFs. For example, the I-CSCF may sum the outbound registration counts received for each S-CSCF and subtract the sum from the value indicating the registration capacity of the S-CSCF. The resulting difference is the value indicating the updated registration capacity of each S-CSCF.

In step 606, the process includes using, by the first I-CSCF, the values indicating the updated registration capacities to select an S-CSCF for at least one outbound registration message. For example, each I-CSCF may provide the values indicating updated registration capacities of the S-CSCFs to a load balancing algorithm implemented by each I-CSCF. The load balancing algorithm may use the values indicating the updated registration capacities to perform S-CSCF selection. If the load balancing algorithm is a weighted round robin algorithm, the load balancing algorithm may utilize the relative values of the updated registration capacities as weights in performing the S-CSCF selection. The updated registration capacities may also be used to avoid selecting unhealthy or overloaded S-CSCFs. For example, if the value indicating the registration capacity indicates that a particular S-CSCF is overloaded, that S-CSCF may be excluded from S-CSCF selection for a given IMS registration request, for a predetermined time interval, or until the health status of the S-CSCF indicates that the S-CSCF is no longer overloaded.

The disclosure of each of the following references is hereby incorporated herein by reference in its entirety.

REFERENCES

1. Fajardo et al., Diameter Base Protocol, IETF RFC 6733, October 2012.
2. Rosenberg et al., Session Initiation Protocol, IETF RFC 3261, July 2002.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for exchanging outbound registration count information among interrogating call session control functions (I-CSCFs) and using the outbound registration count information for serving CSCF (S-CSCF) selection, the method comprising:

receiving, at a first I-CSCF of a plurality of I-CSCFs in a cluster of I-CSCFs and from each of a plurality of S-CSCFs in a cluster of S-CSCFs, a value indicating a registration capacity of the S-CSCF;

receiving, at the first I-CSCF and from at least one other I-CSCF in the cluster of I-CSCFs, outbound registration counts indicating numbers of outbound registrations that the at least one other I-CSCF has with the S-CSCFs in the cluster of S-CSCFs, wherein receiving the outbound registration counts includes receiving the outbound registration counts via a Diameter interface, wherein receiving the outbound registration counts via the Diameter interface includes receiving the outbound registration counts via Diameter service association request (SVR) messages, wherein receiving the outbound registration counts via the Diameter SVR messages includes receiving the outbound registration counts via an outbound registration count attribute value pair (AVP) included in each of the Diameter SVR messages, and wherein receiving the outbound registration counts via the outbound registration count AVP includes receiving, for each of the S-CSCFs with which the at least one other I-CSCF has active registrations, an S-CSCF name and a corresponding outbound registration count;

calculating, by the first I-CSCF and using the values indicating the registration capacities of the S-CSCFs and the outbound registration counts, values indicating updated registration capacities of the S-CSCFs; and using, by the first I-CSCF, the values indicating the updated registration capacities to select an S-CSCF for at least one outbound registration message.

2. The method of claim 1 wherein receiving the values indicating the registration capacities of the S-CSCFs includes receiving the values indicating the registration capacities over a Diameter interface.

3. The method of claim 1 wherein calculating the value indicating the updated registration capacity of each of the S-CSCFs includes, for each of the S-CSCFs, summing the outbound registration count received from the at least one other I-CSCF in the cluster of I-CSCFs and an outbound registration count of the first I-CSCF to generate a total registration count for the S-CSCF and subtracting the total registration count from the value indicating the registration capacity of the S-CSCF.

4. The method of claim 1 wherein using the values indicating the updated registration capacities to select an S-CSCF for an outbound registration message includes providing the values indicating the updated registration capacities to a load balancing algorithm that selects the S-CSCF.

5. The method of claim 1 wherein using the values indicating the updated registration capacities to select the S-CSCF includes using the values indicating the updated registration capacities to determine that one S-CSCF is unhealthy or more loaded than another S-CSCF in the cluster of S-CSCFs and to select an alternate S-CSCF from the cluster of S-CSCFs.

6. The method of claim 1 comprising communicating, by the first I-CSCF, outbound registration counts of the first I-CSCF to the at least one other I-CSCF in the cluster of I-CSCFs.

7. A system for exchanging outbound registration count information among interrogating call session control functions (I-CSCFs) and using the outbound registration count information for serving CSCF (S-CSCF) selection, the system comprising:

a first I-CSCF of a plurality of I-CSCFs in a cluster of I-CSCFs, the first I-CSCF including at least one processor and a memory;

an updated registration capacity calculation module executable by the at least one processor for receiving, from each of a plurality of S-CSCFs in a cluster of S-CSCFs, a value indicating a registration capacity of the S-CSCF, receiving, from at least one other I-CSCF in the cluster of I-CSCFs, outbound registration counts indicating numbers of outbound registrations that the at least one other I-CSCF has with the S-CSCFs in the cluster of S-CSCFs, and calculating, using the values indicating the registration capacities of the S-CSCFs and the outbound registration counts, values indicating updated registration capacities of the S-CSCFs, wherein the updated registration capacity calculation module is configured to receive the outbound registration counts via a Diameter interface, wherein the updated registration capacity calculation module is configured to receive the outbound registration counts via Diameter service association request (SVR) messages, wherein the Diameter SVR messages each include an outbound registration count attribute value pair (AVP) that carries the outbound registration counts, and wherein the outbound registration count AVP includes an S-CSCF name and a corresponding outbound registration count; and an S-CSCF selection module executable by the at least one processor for using the values indicating the updated registration capacities to select an S-CSCF for at least one outbound registration message.

8. The system of claim 7 wherein the updated registration capacity calculation module is configured to receive the values indicating the registration capacities of the S-CSCFs over a Diameter interface.

9. The system of claim 7 wherein, in calculating the value indicating the updated registration capacity of each of the S-CSCFs, the updated registration capacity calculation module is configured to, for each of the S-CSCFs, sum the outbound registration count received from the at least one other I-CSCF in the cluster of I-CSCFs and an outbound registration count of the first I-CSCF to generate a total registration count for the S-CSCF and subtract the total registration count for the S-CSCF from the value indicating the registration capacity of the S-CSCF.

10. The system of claim 7 wherein, in using the values indicating the updated registration capacities to select an S-CSCF for an outbound registration message, the S-CSCF selection module is configured to provide the values indicating the updated registration capacities to a load balancing algorithm that selects the S-CSCF.

11. The system of claim 7 comprising an outbound registration count tracking/communication module for communicating outbound registration counts of the first I-CSCF to the at least one other I-CSCF in the cluster of I-CSCFs.

12. A non-transitory computer readable medium having stored thereon executable instructions that when executed by a processor of a computer control the computer to perform steps comprising:

receiving, at a first interrogating call session control function (I-CSCF) of a plurality of I-CSCFs in a cluster of I-CSCFs and from each of a plurality of serving CSCFs (S-CSCFs) in a cluster of S-CSCFs, a value indicating a registration capacity of the S-CSCF;

receiving, at the first I-CSCF and from at least one other I-CSCF in the cluster of I-CSCFs, outbound registration counts indicating numbers of outbound registrations that the at least one other I-CSCF has with the S-CSCFs in the cluster of S-CSCFs, wherein receiving the outbound registration counts includes receiving the outbound registration counts via a Diameter interface, wherein receiving the outbound registration counts via the Diameter interface includes receiving the outbound registration counts via Diameter service association request (SVR) messages, wherein receiving the outbound registration counts via the Diameter SVR messages includes receiving the outbound registration counts via an outbound registration count attribute value pair (AVP) included in each of the Diameter SVR messages, and wherein receiving the outbound registration counts via the outbound registration count AVP includes receiving, for each of the S-CSCFs with which the at least one other I-CSCF has active registrations, an S-CSCF name and a corresponding outbound registration count;

calculating, by the first I-CSCF and using the values indicating the registration capacities of the S-CSCFs and the outbound registration counts, values indicating updated registration capacities of the S-CSCFs; and using, by the first I-CSCF, the values indicating the updated registration capacities to select an S-CSCF for at least one outbound registration message.

* * * * *